United States Patent

Puyenbroek

Patent Number: 6,072,010
Date of Patent: Jun. 6, 2000

[54] POLYETHERIMIDE RESIN COMPOSITIONS WITH IMPROVED DUCTILITY

[75] Inventor: Robert Puyenbroek, Bergen op Zoom, Netherlands

[73] Assignee: General Electric Co., Pittsfield, Mass.

[21] Appl. No.: 08/996,610

[22] Filed: Dec. 23, 1997

[51] Int. Cl.[7] .......................... C08F 283/04; C08L 79/08
[52] U.S. Cl. .................. 525/425; 528/176; 528/183; 528/185; 528/187; 528/219; 528/272; 528/296; 528/298; 528/332; 528/353; 528/423; 525/420; 525/431; 525/433; 525/436; 525/437; 525/439; 525/446; 525/474; 525/534; 525/540
[58] Field of Search ................... 528/176, 183, 528/185, 187, 219, 272, 296, 298, 332, 353, 423; 525/420, 437, 439, 446, 474, 534, 540, 425, 431, 433, 436

[56] References Cited

U.S. PATENT DOCUMENTS

| | | |
|---|---|---|
| 3,544,514 | 12/1970 | Schnell et al. . |
| 3,635,895 | 1/1972 | Kramer . |
| 3,803,085 | 4/1974 | Takehoshi et al. . |
| 3,814,869 | 6/1974 | DeLuca . |
| 3,847,867 | 11/1974 | Heath et al. . |
| 3,850,885 | 11/1974 | Takehoshi et al. . |
| 3,852,242 | 12/1974 | White . |
| 3,855,178 | 12/1974 | White et al. . |
| 3,905,942 | 9/1975 | Takekoshi et al. . |
| 3,972,902 | 8/1976 | Heath et al. . |
| 3,983,093 | 9/1976 | Williams, III et al. . |
| 4,001,184 | 1/1977 | Scott ........................... 260/47 |
| 4,455,410 | 6/1984 | Giles, Jr. . |
| 5,051,483 | 9/1991 | Rock et al. ..................... 525/425 |

FOREIGN PATENT DOCUMENTS 0 519 657 A1  12/1992  European Pat. Off. .

Primary Examiner—Samuel A. Acquah

[57] ABSTRACT

A thermoplastic resin composition containing a polyetherimide resin, a siloxane-polyetherimide copolymer and a branched polycarbonate resin exhibits exhibit high heat distortion temperature, improved room temperature impact properties and improved impact strength and ductility at low temperatures.

12 Claims, No Drawings

POLYETHERIMIDE RESIN COMPOSITIONS WITH IMPROVED DUCTILITY

FIELD OF THE INVENTION

The invention relates to polyetherimide resin compositions that exhibit improved ductility.

BRIEF DESCRIPTION OF THE RELATED ART

Thermoplastic resin blends containing a polyetherimide resin, a siloxane-polyetherimide copolymer, and a minor amount of a polycarbonate resin have been disclosed in U.S. Pat. No 5,051,483. The blends are said to exhibit high heat distortion temperature, excellent impact properties, good solvent resistance and good processability.

It is believed that these thermoplastic resin blends would find even wider applicability if their impact strength and ductility at low temperatures could be improved.

SUMMARY OF THE INVENTION

In a first aspect, the present invention is directed to thermoplastic resin composition, comprising:
(a) a polyetherimide resin;
(b) a siloxane-polyetherimide copolymer; and
(c) a branched polycarbonate resin.

The '483 patent discloses that both linear and branched polycarbonate resins are suitable as the polycarbonate resin component of the resin blend of the '483 patent. However, the '483 patent provides no experimental results regarding branched polycarbonate resins and provides no teaching or suggestion that the performance of a resin blend containing a branched polycarbonate resin would differ from that of an analogous resin composition containing a linear polycarbonate resin.

The thermoplastic resin compositions of the present invention exhibit high heat distortion temperature, improved room temperature impact properties and improved impact strength and ductility at low temperatures, compared to the linear polycarbonate resin-containing resin blends of the '483 patent.

DETAILED DESCRIPTION OF THE INVENTION

In a preferred embodiment, the thermoplastic resin composition of the present invention is comprises, based on 100 parts by weight ("pbw") of the thermoplastic resin composition, from 50 to 95 pbw, more preferably from 55 to 90 pbw and still more preferably from 60 to 85 pbw, of the polyetherimide, resin; from 0.5 to 12 pbw, more preferably from 2 to 10 pbw and still more preferably from 2 to 8 pbw, of the siloxane-polyetherimide copolymer; and from 5 to 45 pbw, more preferably from 10 to 40 pbw and still more preferably from 15 to 35 pbw, of the branched polycarbonate resin.

Polyetherimide resins suitable for use as component (a) of the thermoplastic resin of the composition of the present invention are known compounds whose preparation and properties have been described, see generally, U.S. Pat. Nos. 3,803,085 and 3,905,942, the respective disclosures of which are incorporated herein by reference.

In a preferred embodiment, the polyetherimide resin component of the present invention contains from greater than 1 to 1000 or more, preferably from 10 to 1000, structural units of the formula (I):

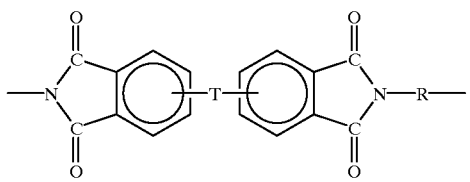

wherein the divalent T moiety bridges the 3,3', 3,4',4,3', or 4,4' positions of the aryl rings of the respective aryl imide moieties of formula (I); T is —O— or a group of the formula —O—Z—O—; Z is a divalent radical selected from the group consisting of formulae (II):

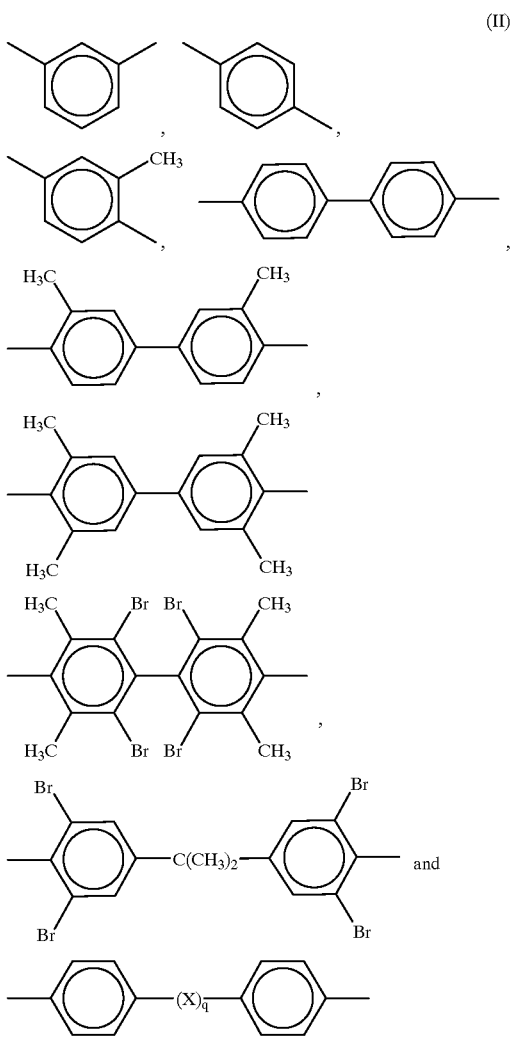

wherein X is a member selected from the group consisting of divalent radicals of the formulae (III):

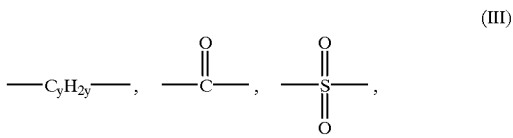

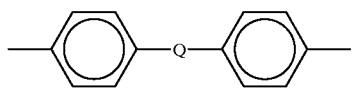

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

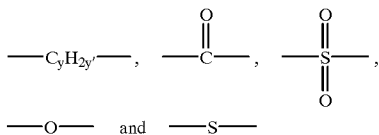

(IV)

where Q is a member selected from the group consisting of formulae (V):

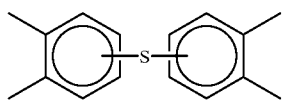

(V)

where y' is an integer from about 1 to about 5.

In one embodiment, the polyethermide resin may be a copolymer which, in addition to the etherimide units described above, further contains polyimide repeating units of the formula (VI):

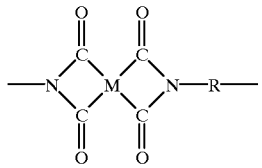

(VI)

wherein R is as previously defined for formula (I) and M is selected from the group consisting of formula (VII):

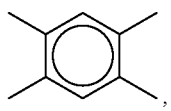

(VII)

formula (VIII):

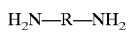

(VIII)

and formula (IX):

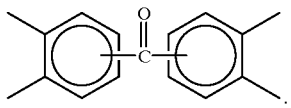

(IX)

Polyetherimide resins are made by known methods, such as, for example, those disclosed in U.S. Pat. Nos. 3,847,867, 3,814,869, 3,850,885, 3,852,242 3,855,178 and 3,983,093, the disclosures of which are hereby incorporated herein by reference.

In a preferred embodiment, the polyetherimide resin is made by the reaction of an aromatic bis(ether anhydride) of the formula (X):

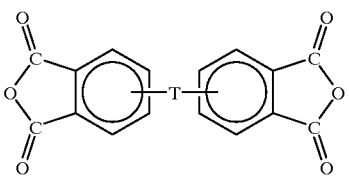

(X)

with an organic diamine of the formula (XI):

$$H_2N-R-NH_2 \quad \text{(XI)}$$

wherein T and R are defined as described above in formula (I). In general the reactions can be carried out employing well-known solvents, e.g., o-dichlorobenzene, m-cresol/toluene and the like to effect interaction between the anhydride of formula (X) and the diamine of formula (XI), at temperatures from about 100° C. to about 250° C. Alternatively, the polyethermide resin can be prepared by melt polymerization of aromatic bis(ether anhydride)s and diamines accomplished by heating a mixture of the ingredients at elevated temperatures with concurrent stirring. Generally melt polymerizations employ temperatures between about 200° C. and 400° C. Chain stoppers and branching agents may also be employed in the reaction.

Examples of specific aromatic bis(ether anhydrides) and organic diamines are disclosed, for example, in U.S. Pat. Nos. 3,972,902 and 4,455,410, which are incorporated by reference herein.

Illustrative examples of aromatic bis(ether anhydride)s of formula (X) include: 2,2-bis(4-(3,4-dicarboxyphenoxy) phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3, 4-dicarboxyphenoxy)benzophenone dianhydride; 4,4'-bis(3, 4-dicarboxyphenoxy)diphenyl sulfone dianhydride; 2,2-bis ([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2, 3-dicarboxyphenoxy)4'-(3,4-dicarboxyphenoxy)diphenyl ether dianhydride; 4-(2,3-dicarboxyphenoxy)4'-(3,4-dicarboxyphenoxy)diphenyl sulfide dianhydride; 4-(2,3-dicarboxyphenoxy)-4'-(3,4-dicarboxyphenoxy) benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (X) above includes compounds wherein T is of the formula (XII):

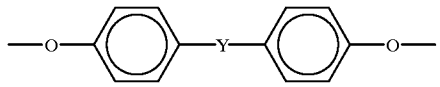
(XII)

wherein each Y is independently selected from the group consisting of: formulae (XIII):

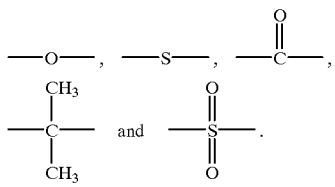
(XIII)

When polyetherimide/polyimide copolymers are employed, a dianhydride, such as pyromellitic anhydride, is used in combination with the bis(ether anhydride).

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

Suitable organic diamines of formula (XI) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Illustrative of a particularly preferred polyetherimide resin falling within the scope of Formula (I) is one comprising repeating units wherein R is paraphenylene, metaphenylene, or mixtures of paraphenylene and metaphenylene and T is a group of the formula —O—Z—O— wherein Z has the formula (XIV):

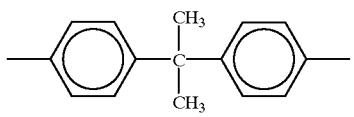
(XIV)

and wherein the divalent group (XIV) bridges the 3,3' positions of the aryl rings of the respective aryl imide moieties of formula (I).

Generally, useful polyetherimide resins have an intrinsic viscosity [η] greater than about 0.2 deciliters per gram, preferably of from about 0.35 to about 0.7 deciliters per gram measured in m-cresol at 25° C. In a preferred embodiment, the polyetherimide resin of the present invention resin has a weight average molecular weight of from 10,000 to 150,000 grams per mole ("g/mol"), as measured by gel permeation chromatography, using a polystyrene standard.

Siloxane-polyetherimide copolymers suitable for use as component (b) of the thermoplastic resin composition of the present invention are known compounds whose preparation and properties have been described, see U.S. Pat. No. 5,051,483, the disclosure of which is hereby incorporated herein by reference.

In a preferred embodiment, the siloxane-polyetherimide copolymer component of the composition of the present invention has first structural units according to one or more of formulae (I) and (VI) and second structural units according to formula one or more of formulae (XV) and (XVI):

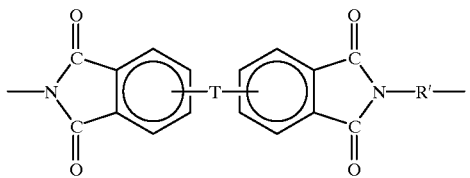
(XV)

(XVI)

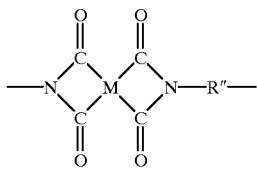

wherein T and M are each defined as above and R' and R" are each independently a divalent radical of the structural formula (XVII):

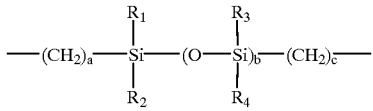
(XVII)

wherein:
$R_1$, $R_2$, $R_3$ and $R_4$ are each independently $(C_1-C_6)$ alkyl,
a and c are each independently integers from 1 to 10, preferably from 1 to 5, and
b is an integer from 1 to about 40, preferably from 5 to 25.

As used herein, the term "$(C_1-C_6)$alkyl" means a straight or branched alkyl group of from 1 to 6 carbon atoms per group, such as, for example, methyl, ethyl, n-butyl, isobutyl, t-butyl, pentyl, hexyl.

In a preferred embodiment, the siloxane-polyetherimide copolymer is made in a manner similar to that described above for the polyetherimide resins, except that all or a portion of the diamine reactant is replaced by an aminoalkyl-terminated organosiloxane compound of the structural formula (XVIII):

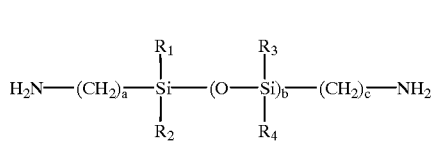
(XVIII)

wherein $R_1$, $R_2$, $R_3$, $R_4$, a, b and c are each defined as above.

In a preferred embodiment, $R_1$, $R_2$, $R_3$, $R_4$ are each methyl, a and c are each 3 and b has an average value of from 9 to 20.

In a preferred embodiment, the siloxane-polyetherimide copolymer is made by reacting an aromatic bis(ether anhydride) of the formula (X) with an organic diamine of formula (XI) and an amine-terminated organosiloxane compound of formula (XVIII). The diamine and amine-terminated organosiloxane may be physically mixed prior to reaction with the aromatic bis(ether anhydride) in order to form a random siloxane-polyetherimide copolymer, or, alternatively, the diamine and amine-terminated organosiloxane may be reacted with the aromatic bis(ether anhydride) in series in order to form an alternating or block copolymer.

In a preferred embodiment, the copolymer comprises from 50 to 80 mole % of the diamine and from 20 to 50 mole % of the amine terminated organosiloxane, based on the combined amount of diamine and amineterminated organosiloxane.

In a preferred embodiment, the siloxane-polyetherimide copolymer has a weight average molecular weight of from 10,000 to 150,000 g/mol, as measured by gel permeation chromatography, using a polystyrene standard.

Branched aromatic polycarbonates suitable as component (c) of the thermoplastic resin composition of the present invention are known compounds whose preparation and properties have been described, see generally, U.S. Pat. Nos. 3,544,514, 3,635,895 and 4,001,184, the respective disclosures of which are incorporated herein by reference.

In a preferred embodiment, the branched polycarbonate resin of component (c) is the product of a condensation polymerization reaction of polyfunctional compound with a carbonate precursor and a dihydric phenol according to the structural formula (XIX):

HO—A—OH         (XIX)

wherein A is a divalent aromatic radical, and is characterized by a branched structure containing structural units according to the formula (XX):

(XX)

wherein A is defined as above.

As used herein, the term "divalent aromatic radical" includes those divalent radicals containing a single aromatic ring such as phenylene, those divalent radicals containing a condensed aromatic ring system such as, for example, naphthlene, those divalent radicals containing two or more aromatic rings joined by non-aromatic linkages, such as for example, an alkylene, alkylidene or sulfonyl group, any of which may be substituted at one or more sites on the aromatic ring with, for example, a halo group or ($C_1$–$C_6$) alkyl group.

In a preferred embodiment, A is a divalent aromatic radical according to the formula (XXI):

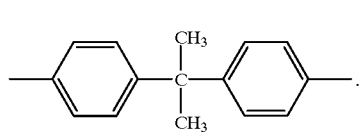
(XXI)

Suitable polyfunctional compounds are generally aromatic and contain at least three functional groups selected from one or more of carboxyl, carboxylic anhydrides, phenols, haloformates, such as, for example, 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic dianhydride. The preferred polyfunctional aromatic compounds are 1,1,1-tri(4-hydroxyphenyl) ethane, trimellitic anhydride or trimellitic acid or their haloformate derivatives.

Suitable dihydric phenols include, for example, one or more of 2,2-bis-(4-hydroxyphenyl) propane ("bisphenol A"), 2,2-bis(3,5-dimethyl-4-hydroxyphenyl)propane, bis(4-hydroxyphenyl) methane, 4,4-bis(4-hydroxyphenyl) heptane, 35,3',5'-tetrachloro-4,4'-dihydroxyphenyl)propane, 2,6-dihydroxy naphthalene, hydroquinone, 2,4'-dihydroxyphenyl sulfone. In a highly preferred embodiment, the dihydric phenol is bisphenol A.

The carbonate precursor is one or more of a carbonyl halide, a carbonate ester or a haloformate. Suitable carbonyl halides include, for example, carbonyl bromide and carbonyl chloride. Suitable carbonate esters include, such as for example, diphenyl carbonate, dichlorophenyl carbonate, dinaphthyl carbonate, phenyl tolyl carbonate and ditolyl carbonate. Suitable haloformates include for example, bishaloformates of a dihydric phenols, such as, for example, hydroquinone, or glycols, such as, for example, ethylene glycol, neopentyl glycol. In a highly preferred embodiment, the carbonate precursor is carbonyl chloride.

In a preferred embodiment, the weight average molecular weight of the branched aromatic polycarbonate resin is from about 10,000 to about 150,000 g/mol, more preferably from about 10,000 to about 60,000 g/mol, as determined by gel permeation chromatography relative to polystyrene.

The thermoplastic resin composition of the present invention may, optionally, also contain various additives which are well known in the art, such as antioxidants, such as, for example, organophosphites, for example, tris(nonyl-phenyl) phosphite, tris(2,4-di-t-butylphenyl)phosphite, bis(2,4-di-t-butylphenyl)pentaerythritol diphosphite, 2,4-di-tert (butylphenyl) phosphite or distearyl pentaerythritol diphosphite, alkylated monophenols, polyphenols and alkylated reaction products of polyphenols with dienes, such as, for example, tetra-cis(methylene)-3,5-di-t-butyl4-hydroxycinnamate, butylated reaction products of para-cresol and dicyclopentadiene, alkylated hydroquinones, hydroxylated thiodiphenyl ethers, alkylidene-bisphenols, benzyl compounds, acylaminophenols, esters of beta-(3,5- di-tert-butyl-4-hydroxyphenol)-propionic acid with monohydric or polyhydric alcohols, esters of beta-(5-tert-butyl-4-hydroxy-3-methylphenyl)-propionic acid with monohydric or polyhydric alcohols, esters of beta-(5-tert-butyl-4-hydroxy-3-methylphenyl) propionic acid with mono-or polyhydric alcohols, esters of thioalkyl or thioaryl compounds, such as, for example, distearylthiopropionate, dilaurylthiopropionate, ditridecylthiodipropionate, amides of beta-(3,5-di-tert-butyl-4-hydroxyphenol)-propionic acid; fillers and reinforcing agents, such as, for example, silicates, $TiO_2$, glass fibers, carbon black, graphite, calcium carbonate, talc, mica and other additives such as, for example, UV absorbers, light stabilizers, lubricants, plasticizers, pigments, dyes, colorants, anti-static agents, blowing agents.

The preparation of the compositions of the present invention is normally achieved by combining and mixing the components of the composition of the present invention under conditions suitable for the formation of a blend of the components. Such conditions include, for example, solution blending or melt mixing in single or twin screw type extruders, mixing bowl, or similar mixing devices which can apply a shear to the components. Twin screw extruders are often preferred due to their more intensive mixing capability over single screw extruders. It is often advantageous to apply a vacuum to the melt through at least one vent port in the extruder to remove volatile impurities in the composition.

The composition of the present invention can be molded into useful articles, such as, for example, heat resistant containers, by a variety of means such as, for example, injection molding or extrusion.

EXAMPLES

The respective thermoplastic resin compositions of Comparative Examples C1, C2 and C3 and Examples 1 and 2 of the present invention were each made by combining the components described below in the relative amounts (each expressed in percent by weight, based on the total weight of the respective thermoplastic resin composition) set forth in TABLE I. The components used in the thermoplastic resin compositions were as follows:

PEI: Polyetherimide resin made by condensation of 2,2-bis (2,3-dicarboxy phenoxy phenol)propane dianhydride with metaphenylene diamine and having a weight average molecular weight of about $55 \times 10^3$ g/mol PC-1: Linear polycarbonate resin derived from bisphenol-A and phosgene and having a weight average molecular weight of about $36.5 \times 10^3$ g/mol.

PC-2: Branched polycarbonate resin derived from bisphenol A, phosgene and trimellitic trichlorite and having a weight average molecular weight of about $34 \times 10^3$ g/mol.

Si-PEI: Siloxane/polyetherimide copolymer made by condensation of 2,2-bis(2,3-dicarboxy phenoxy phenol) propane dianhydride with metaphenylene diamine and an aminopropyl-terminated $D_{10}$ polydimethylsiloxane, containing 34 wt % of structural units derived from the polydimethylsiloxane and having a weight average molecular weight of about $60 \times 10^3$ g/mol.

In a series of runs, the components were blended in a twin screw extruder at a temperature of about 320° C. to about 340° C. to form the respective compositions of Examples 1 and 2 and Comparative Examples C1–C3. The compositions were then extruded into strands, chopped into pellets and then injection molded to form test specimens for physical property testing.

Dart impact strength was measured according to ASTM D3763 (using 4 inch diameter by 0.125 inch disks) at various temperatures, as indicated below in TABLE I. Notched Izod impact strength was measured, using a sample size of 2.5 inch by 0.5 inch by 0.125 inch, according to ASTM D256. Heat distortion temperature was measured at 264 pounds per square inch ("psi") on unannealed 0.125 inch thick test specimens according to ASTM D648.

Results of the testing are set forth below for each of the Comparative Examples C1–C3 and Examples 1 and 2 in TABLE I as follows: dart impact, expressed in foot-pounds ("ft-lb") and noting the percentage of specimens that exhibited a ductile fracture mode ("% ductile"), notched Izod impact strength, expressed in foot-pounds per inch ("ft-lb/in") and heat distortion temperature, expressed in degrees centigrade ("HDT, ° C.").

TABLE I

|  | CEx# C1 | CEx# C2 | Ex 1 | CEx# C3 | EX 2 |
|---|---|---|---|---|---|
| PEI | 75.7 | 79.7 | 75.7 | 69.7 | 65.7 |
| PC-1 | 20 | — | — | — | — |
| PC-2 | — | 20 | 20 | 30 | 30 |
| Si-PEI | 4 | — | 4 | — | 4 |
| Stabilizer | 0.3 | 0.3 | 0.3 | 0.3 | 0.3 |
| Properties |  |  |  |  |  |
| Dart Impact, 25° C. (ft-lb/% ductile) | 55.1/100 | 58.7/100 | 49.5/100 | 46.1/100 | 45.3/100 |
| Dart Impact, 0° C. (ft-lb/% ductile) | 55.5/100 | 69.4/80 | — | 67.1/80 | — |
| Dart Impact, −30° C. (ft-lb/% ductile) | 52.6/100 | 48.0/20 | 74.6/100 | 67.7/0 | 71.0/100 |
| Notched Izod Impact (ft-lb/in) | 1.8 | 1.6 | 2 | 2.7 | 3.5 |
| HDT (° C.) | 188 | 198 | 196 | 190 | 190 |

The composition of Comparative Example C1 is analogous to that of Example 1, except that Comparative Example C1 contains a linear polycarbonate resin rather than the branched polycarbonate resin of Example 1. The composition of Example 1 exhibited dramatically improved dart impact performance at −30° C. as well as improved notched Izod impact performance, compared to the composition of Comparative Example C1.

The composition of Comparative Example C2 is analogous to that of Example 1, except that Comparative Example C2 lacks the siloxane-polyetherimide copolymer of the composition of Example 1. The composition of Example 1 exhibited dramatically improved dart impact performance at −30° C. as well as improved notched Izod impact performance, compared to the composition of Comparative Example C2.

The composition of Comparative Example C3 is analogous to that of Example 2, except that Comparative Example C3 lacks the siloxane-polyetherimide copolymer of Example 2. The composition of Example 2 exhibited dramatically improved dart impact performance at −30° C. as well as improved notched Izod impact performance, compared to the composition of Comparative Example C3.

The thermoplastic resin compositions of the present invention provides high heat distortion temperature, improved room temperature impact properties and improved impact strength and ductility at low temperatures.

I claim:

1. A thermoplastic resin composition, comprising:

(a) a polyetherimide resin;

(b) a siloxane-polyetherimide copolymer; and (c) a branched polycarbonate resin.

2. The composition of claim 1, wherein the composition comprises from 50 to 95 parts by weight of the polyetherimide resin, from 0.5 to 12 parts by weight of the siloxane-polyetherimide copolymer; and from 5 to 45 parts by weight of the branched polycarbonate resin.

3. The composition of claim 1, wherein the polyetherimide resin comprises structural units of the formula (I):

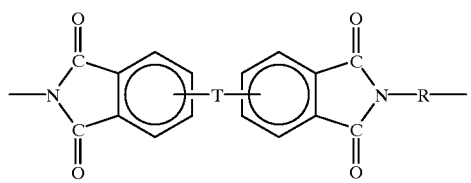

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

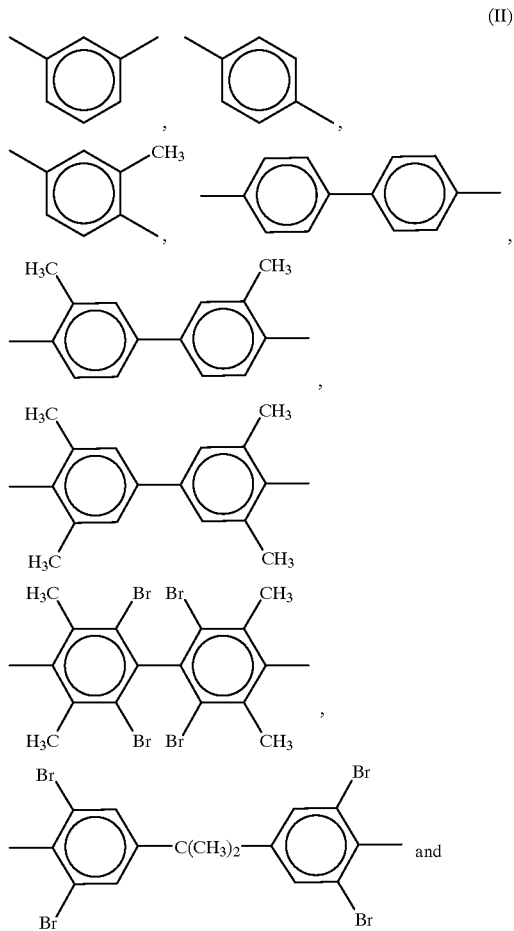

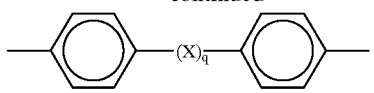

wherein X is a member selected from the group consisting of divalent radicals of the formulae (III):

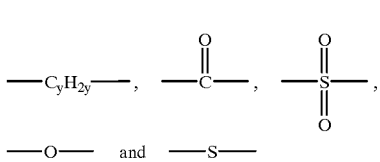

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

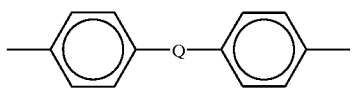

where Q is a member selected from the group consisting of formulae (V):

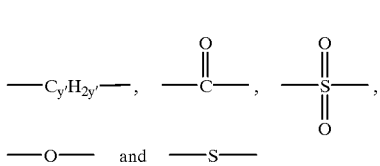

where y' is an integer from about 1 to about 5.

4. The composition of claim 1, wherein the polyetherimide resin is the reaction product former by melt polymerization of 2,2-bis[4-(3,4-dicarboxyphenoxy)phenyl]propane dianhydride with metaphenylene diamine.

5. The composition of claim 1, wherein the branched aromatic polycarbonate resin is made by reacting a polyfunctional aromatic compound with a dihydric phenol and a carbonate precursor to form a branched polymer.

6. The composition of claim 5, wherein the polyfunctional compound is one or more compound selected from the group consisting of 1,1,1-tri(4-hydroxyphenyl)ethane, 1,3,5,-trihydroxy-benzene, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid and benzophenone-tetracarboxylic dianhydride.

7. The composition of claim 5, wherein the dihydric phenol is one or more compound selected from the group consisting of 2-bis-(4-hydroxyphenyl) propane ("bisphenol A"), 2,2-bis(3,5-dimethyl4-hydroxyphenyl)propane, bis(4-hydroxyphenyl) methane, 4,4-bis(4-hydroxyphenyl)

heptane, 35,3',5'-tetrachloro-4,4'-dihydroxyphenyl)propane, 2,6-dihydroxy naphthalene, hydroquinone and 2,4'-dihydroxyphenyl sulfone.

8. The composition of claim 5, wherein the carbonate precursor is one or more compound selected from the group consisting of carbonyl halides, carbonate esters and haloformates.

9. The composition of claim 1, wherein the siloxane-polyetherimide copolymer is the reaction product of an aromatic bis(ether anhydride) with a diamine and an aminoalkyl-terminated organosiloxane compound of the structural formula:

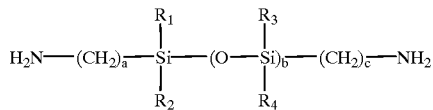

wherein:

$R_1$, $R_2$, $R_3$ and $R_4$ are each independently $(C_1–C_6)$alkyl, a and c are each independently integers from 1 to 10, and b is an integer from 1 to about 40, preferably from 5 to 25.

10. The composition of claim 9, wherein $R_1$, $R_2$, $R_3$, $R_4$ are each methyl, a and c are each 3 and b has an average value of from 9 to 20.

11. A thermoplastic resin composition, comprising the composition obtained by blending:

(a) a polyetherimide resin;

(b) a siloxane-polyetherimide copolymer; and (c) a branched polycarbonate resin.

12. A shaped article made by molding the composition of claim 1.

* * * * *